United States Patent
Wilson (10) Patent No.: US 9,934,492 B2
(45) Date of Patent: Apr. 3, 2018

(54) AUTOMOTIVE ECU MOBILE PHONE INTERFACE

(71) Applicant: CellAssist, LLC, Amherst, MA (US)

(72) Inventor: Hendalee Wilson, Whitinsville, MA (US)

(73) Assignee: CellAssist, LLC, Amherst, MA (US)

( * ) Notice: Subject to any disclaimer, the term of this patent is extended or adjusted under 35 U.S.C. 154(b) by 0 days.

(21) Appl. No.: 15/278,160

(22) Filed: Sep. 28, 2016

(65) Prior Publication Data
US 2017/0200134 A1 Jul. 13, 2017

Related U.S. Application Data

(63) Continuation of application No. 11/423,873, filed on Jun. 13, 2006, now Pat. No. 9,483,880.

(51) Int. Cl.
| | |
|---|---|
| G06Q 10/00 | (2012.01) |
| G07C 5/00 | (2006.01) |
| G06Q 30/06 | (2012.01) |
| G06Q 10/08 | (2012.01) |
| H04W 84/04 | (2009.01) |
| H04W 4/02 | (2018.01) |

(52) U.S. Cl.
CPC ......... *G06Q 10/20* (2013.01); *G06Q 10/0875* (2013.01); *G06Q 30/0635* (2013.01); *G07C 5/008* (2013.01); *H04W 4/02* (2013.01); *H04W 84/042* (2013.01)

(58) Field of Classification Search
CPC ............................... G06Q 10/20; G07C 5/008
USPC ............ 701/29.1, 29.4, 29.5, 31.4, 31.5, 36
See application file for complete search history.

(56) References Cited

U.S. PATENT DOCUMENTS

| | | | |
|---|---|---|---|
| 4,602,127 | A | 7/1986 | Neeley et al. |
| 4,843,557 | A | 6/1989 | Ina et al. |
| 4,924,398 | A | 5/1990 | Fujiwara |
| 4,989,146 | A | 1/1991 | Imajo |
| 5,243,852 | A | 9/1993 | Morita |
| 5,442,553 | A | 8/1995 | Parrillo |
| 5,781,125 | A | 7/1998 | Godau et al. |
| 5,844,473 | A | 12/1998 | Kaman |
| 5,884,202 | A | 3/1999 | Arjomand |
| 6,175,934 | B1 | 1/2001 | Hershey et al. |
| 6,253,122 | B1 | 6/2001 | Razavi et al. |
| 6,263,268 | B1 | 7/2001 | Nathanson |
| 6,278,919 | B1 | 8/2001 | Hwang et al. |
| 6,295,492 | B1 | 9/2001 | Lang et al. |
| 6,330,499 | B1 | 12/2001 | Chou et al. |

(Continued)

OTHER PUBLICATIONS

U.S. Appl. No. 11/423,873, filed Jun. 13, 2006, Wilson.
U.S. Appl. No. 14/100,644, filed Dec. 9, 2013, Wilson.

*Primary Examiner* — Thomas G Black
*Assistant Examiner* — Wae L Louie
(74) *Attorney, Agent, or Firm* — Wolf, Greenfield & Sacks, P.C.

(57) ABSTRACT

The invention is a system for interfacing mobile phones with an on-board diagnostic computer in a vehicle, wherein the on-board diagnostic computer monitors a set of operational characteristics of a vehicle. The information derived from this system will be processed on the mobile phone coupled with additional information and displayed on the mobile phone's screen, while simultaneously transmitting this information over the internet to be stored in a database.

54 Claims, 3 Drawing Sheets

(56) References Cited

U.S. PATENT DOCUMENTS

| | | | |
|---|---|---|---|
| 6,339,736 B1 * | 1/2002 | Moskowitz | G06Q 10/087 340/988 |
| 6,362,730 B2 | 3/2002 | Razavi et al. | |
| 6,370,449 B1 | 4/2002 | Razavi et al. | |
| 6,370,454 B1 | 4/2002 | Moore | |
| 6,507,810 B2 * | 1/2003 | Razavi | G01C 21/26 703/23 |
| 6,668,219 B2 | 12/2003 | Hwang et al. | |
| 6,735,503 B2 | 5/2004 | Ames | |
| 6,735,630 B1 | 5/2004 | Gelvin et al. | |
| 6,754,183 B1 | 6/2004 | Razavi et al. | |
| 6,920,382 B2 | 6/2005 | Katagishi et al. | |
| 6,956,501 B2 | 10/2005 | Kitson | |
| 6,972,669 B2 * | 12/2005 | Saito | B60G 17/0185 340/438 |
| 7,023,332 B2 | 4/2006 | Saito et al. | |
| 7,073,714 B2 * | 7/2006 | Namaky | G07C 5/0816 235/462.15 |
| 7,308,341 B2 | 12/2007 | Schofield et al. | |
| 8,666,789 B1 | 3/2014 | Clauss et al. | |
| 9,483,880 B2 | 11/2016 | Wilson | |
| 2001/0051863 A1 | 12/2001 | Razavi et al. | |
| 2002/0025832 A1 | 2/2002 | Durian | |
| 2002/0032042 A1 | 3/2002 | Poplawsky et al. | |
| 2002/0044049 A1 * | 4/2002 | Saito | B60G 17/0185 340/438 |
| 2003/0008680 A1 | 1/2003 | Huh et al. | |
| 2003/0171111 A1 | 9/2003 | Clark | |
| 2003/0195678 A1 | 10/2003 | Betters et al. | |
| 2004/0249557 A1 * | 12/2004 | Harrington | G01M 17/007 701/115 |
| 2005/0096805 A1 * | 5/2005 | Fudali | G07C 5/008 701/31.4 |
| 2005/0131595 A1 | 6/2005 | Luskin et al. | |
| 2007/0156311 A1 * | 7/2007 | Elcock | G07C 5/008 701/31.4 |
| 2007/0271014 A1 | 11/2007 | Breed | |
| 2009/0125178 A1 * | 5/2009 | Wilson | B60W 50/02 701/31.4 |
| 2014/0172228 A1 | 6/2014 | Wilson | |

\* cited by examiner

Fig. 2

AUTOMOTIVE ECU MOBILE PHONE INTERFACE

CROSS-REFERENCE TO RELATED APPLICATIONS

The present application is a continuation of and claims the benefit under 35 U.S.C. § 120 of U.S. patent application Ser. No. 11/423,873, titled "AUTOMOTIVE ECU MOBILE PHONE INTERFACE," filed Jun. 13, 2006, which is incorporated herein by reference in its entirety.

FEDERALLY SPONSORED RESEARCH

Non-applicable.

SEQUENCE LISTING OR PROGRAM

Non-applicable.

BACKGROUND OF INVENTION

The present invention relates to use of a mobile phone to extract automotive data from an automobile's engine control unit (ECU) and translate it into human-readable form on the phone's display, while simultaneously broadcasting the information to an internee-based system for immediate repair and roadside assistance.

PRIOR ART

The Environmental Protection Agency (EPA) requires vehicle manufacturers to install on-board diagnostics (OBD-II) for monitoring light-duty automobiles and trucks beginning with model year 1996. OBD-II systems (e.g., microcontrollers and sensors) monitor the vehicle's electrical and mechanical systems and generate data that are processed by a vehicle's engine control unit (ECU) to detect any malfunction or deterioration in the vehicle's performance. Most ECUs transmit status and diagnostic information over a shared, standardized electronic bus in the vehicle. The bus effectively functions as an on-board computer network with many processors, each of which transmits and receives data. The primary computers in this network are the vehicle's electronic-control module (ECM) and power-control module (PCM). The ECM typically monitors engine functions (e.g., the cruise-control module, spark controller, exhaust/gas recirculator), while the PCM monitors the vehicle's power train (e.g., its engine, transmission, and braking systems). Data available from the ECM and PCM include vehicle speed, fuel level, engine temperature, and intake manifold pressure. In addition, in response to input data, the ECU also generates 5-digit 'diagnostic trouble codes' (DTCs) that indicate a specific problem with the vehicle. The diagnostic trouble codes need to be coupled with OBD-II documentation so the fault code produced by the vehicle can be conceptualized by the auto owner. For instance a DTC of P0118 can be translated to the text 'Engine coolant temperature circuit high input.' The presence of a DTC in the memory of a vehicle's ECU typically results in illumination of the 'Service Engine Soon' light present on the dashboard of most vehicles.

Data from the above-mentioned systems are made available through a standardized, serial 16-cavity connector referred to herein as an 'OBD-II connector'. The OBD-II connector typically lies underneath the vehicle's dashboard. When a vehicle is serviced, data from the vehicle's ECM and/or PCM is typically queried using an external engine-diagnostic tool (commonly called a 'scan tool') that plugs into the OBD-IL connector. The vehicle's engine is turned on and data are transferred from the engine computer, through the OBD-II connector, and to the scan tool. The data are then displayed and analyzed to service the vehicle. Scan tools are typically only used to diagnose stationary vehicles or vehicles running on a dynamometer.

Some vehicle manufacturers also include complex electronic systems in their vehicles to access and analyze some of the above-described data. For example, General Motors includes a system called 'On-Star' in some of their high-end vehicles. On-Star collects and transmits data relating to these DTCs through a wireless network. On-Star systems are not connected through the OBD-II connector, but instead are wired directly to the vehicle's electronic system. This wiring process typically takes place when the vehicle is manufactured.

Prior to this invention, connecting to the OBD-II interface required large costly hardware, which utilized proprietary software, in addition, many of the tools used to access automobile information returned native codes, which are not in a descriptive form and do not offer any indication of the vehicle's malfunction. Furthermore, a vehicle would have to be transported to a location in which the automobile information could be retrieved. Also, instances arise in which vehicles have stored information that state the vehicle should not be driven any further. This cannot be derived until the vehicle is brought to a location that has the expertise, hardware, and software to tell the owner that this is the case. This could cause extreme and irreversible damage to the vehicle. Lastly, the information about vehicle's information is local. This information is compiled locally and not compiled into a database.

The current state of automotive repair service is one where organization must wait for an individual to come in and try to explain symptoms that they perceive the vehicle as having. Automotive repair services must allocate time and resources after the technician have checked the vehicle. This leads to much inefficiency in resource allocation at these organizations.

BACKGROUND OF THE INVENTION OBJECTS AND ADVANTAGES

The Automotive Cellular Interface is a system that uses cellular phones to access automobile computer systems, interpret the information and show the text on the cellular phone's display. Simultaneously transmitting the retrieved information, as well as characteristic and states of the cellular phone used to access the vehicle computer system, to a global network that would alert parties who could assist or benefit from the retrieval retrieved automobile information. An example could be, but not limited to the following scenario.

SUMMARY

The invention is a system for interfacing mobile phones with an on-board diagnostic computer in a vehicle, wherein the on-board diagnostic computer monitors a set of operational characteristics of a vehicle. The information derived from this system will be processed on the mobile phone coupled with additional information and displayed on the mobile phone's screen, while simultaneously transmitting this information over the internet to be stored in a database.

DETAILED DESCRIPTION

Figure 1:
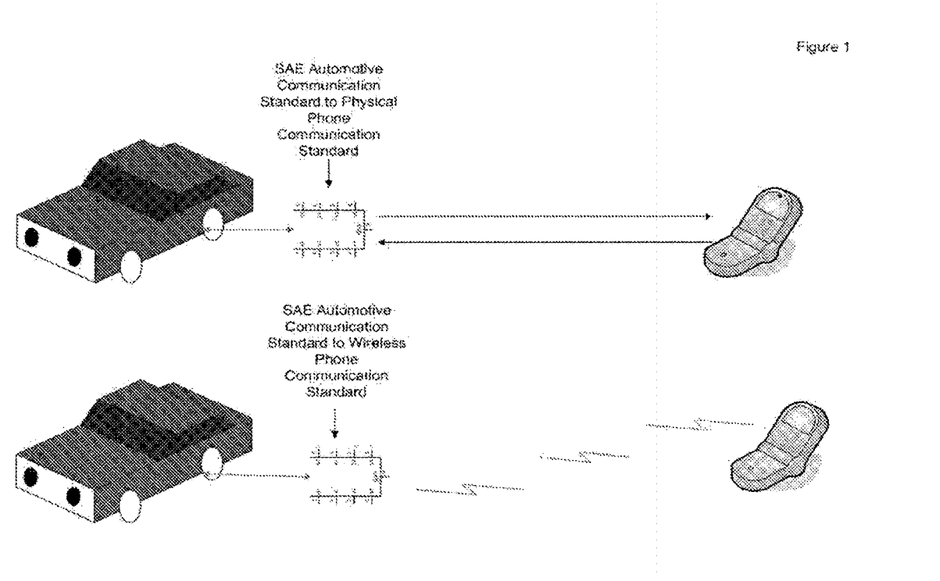
FIG. 1 is a schematic drawing of a system of the invention featuring a single vehicle making contact with the vehicle via a microcontroller.
Figure 2:
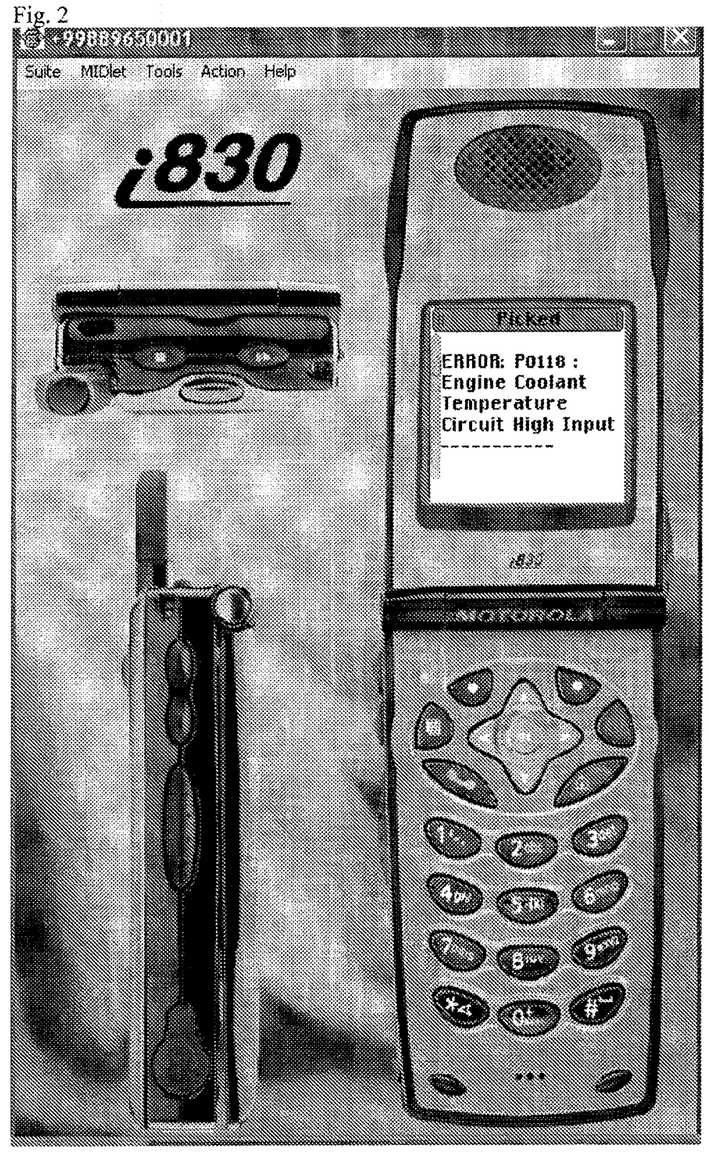
FIG. 2 is an example of the mobile phone display after information has been extracted from the vehicle's ECU.

Description FIG. 1—Shows a cellular phone with software application that can establish a connection with the automobile. In addition, at the point of communication negotiation the application on the cellular phone extracts position location and transmits the response from the vehicle and the location to a server ready to receive this information.

Operation FIG. 1—the standard for the automotive industry for vehicles is the SAE J 1850 communications protocol which utilizes variable pulse width modulation and pulse width modulation. This means that the width of the pulse determines whether it's a 1 or a 0. Most phones form communication with serial connections (RS-232, Infrared, etc.) and wireless connection protocols (Bluetooth, Infrared, etc.). These two protocols must be converted or bridged by some sort of microprocessor so the two communication methodologies can communicate with each other. This can be accomplished by using an 8-pin integrated circuit that can be used to convert the OBD-II signal (which includes different protocols such as, but not limited to: J1850 VPW, J1850 PWM, ISO 9141-2, ISO 14230, ISO 15765) to one of the aforementioned phone communication formats. This can be accomplished by creating an integrated circuit with a Microchip Technology PIC12C5XX 8 pin 8-bit CMOS micro controller (1). The circuit should have a male (GM part #12110252) OBD-II connector and male terminals (GM Part #12047581) on one end and a DB9 serial port connector at the other. It is recommended pins are configured in such a manner that serial hardware handshaking is not required.

The following configuration the microcontroller makes this communication possible:

Pin 1—This pin should be the positive supply pin and should always be the most positive point in the circuit. Internal circuitry connected to this pin should be used to provide power on the reset of the controller, so an external reset signal is not required.

Pin 2 and Pin 3—A 3.57 MHZ NTSC television colourburst crystal is connected between these two pins. Crystal loading capacitors (27 pF) will also be connected between the pin and the common circuit.

Pin 4—The OBD data is input to this pin with a high logic level representing an active state, and a low logic level indicating a passive state. No Schmitt trigger input is provided so the OBD signal should be buffered to minimize transition time for the internal CMOS circuitry.

Pin 5—The transmit signal can be connected directly to this pin as long as a current limiting resistor is installed in series. Internal signal inversion and Schmitt trigger wave shaping provide necessary signal conditioning.

PIN 6—The data output pin.

PIN 7—This is the active low output signal, which is used to drive the OBD bus to its active state.

Pin 8—Circuit common is connected to this pin. This is the most negative point in the circuit.

There are many ways to program this microcontroller for our purpose. Please refer to document 2 for documentation on programming the microcontroller.

These microcontroller aides this process by negotiating timing and voltage differences between automobiles and mobile phones. This is the preferred method as to not damage the automobile computer system and the mobile phone.

Figure 3:
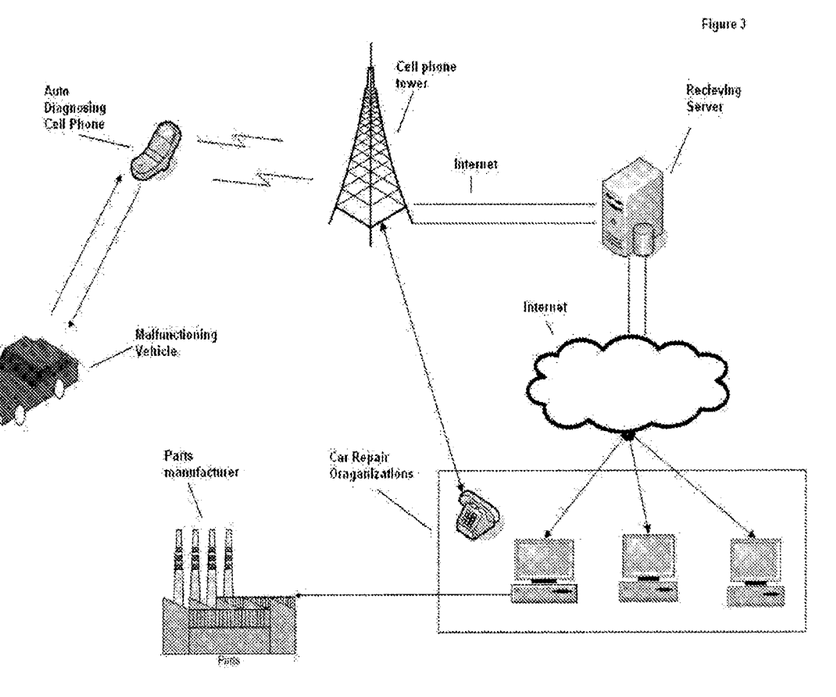
FIG. 3 is a schematic of the flow of information through system of the invention. It shows the dialogue between the users, the system, and organizations connected to the system.

Description FIG. 3—Shows a method describing how the system in FIG. 1 typically operates. The mobile phone operates software that acts as a data-collection agent that connects to a microcontroller connected to the vehicle's OBD-II port that formats that OBD-II data into a communication protocol that the mobile phone can decipher with its native hardware and software.

In one mode of function, the information extracted from the ECU's memory is used to query an information source that has the DTC translation from SAE standard to textual description of information.

At this point other information about the mobile phone and the vehicle's location is being gathered by software housed on the phone. No additional hardware will be added to the phone because federal law mandates that mobile phones have location-based services. Further, information about the mobile phone user, such as phone number, can also be extracted from the phone.

A connection is established to the internet and the above information (the DTC, the location of the malfunctioning vehicle, and the user's contact information) is broadcasted to a server which receives the information and stores the information into a database.

Parties interested in this information can and will be notified when a broadcast happens in their area.

Other embodiments are also within the scope of the invention. The information that is collected in these broadcasts can be utilized for many different purposes. For instance, this information can be used to discover trends in malfunctions or sensor readings in a geographic location. Many organizations (i.e., automobile manufacturers) could use this information to improve their operations. An example of this could be an automobile manufacturer noticing that cars in cold or hot geographic areas have a common component failure and inferring that temperature plays a role in the failure. This information could help auto manufacturers enact costly recalls sooner than later.

In addition, the information received by organizations could be integrated and/or imported into their existing computer information systems to improve operations and increase efficiency. For instance, information that arrives at the repairing organization could be used to automatically order parts necessary for the repair. Also, incoming information could be integrated into the repairing organization's scheduling system so repairs are executed more efficiently.

Furthermore, information derived from this system can be used to increase competition between repairing organizations, Since geographic information is part of the transmitted dataset, local repair shops will have indications on who is broken down and there their current location. Repair shops will also have the capacity to contact these individuals (because their cell phone numbers will also be part of the dataset) and offer their services. Organizations will have to realize that automobile malfunctions are now public knowledge and structure the prices of their services accordingly. Automobile owners will have the opportunity to receive bids for many service providers and pursue the most economically viable.

Lastly, users of this system will be able to form more meaningful dialogues with repairing parties because the technical information will be translated into terminology that even the novice would find comprehendible. Instead of the user viewing fault code "P1358" they will see "P1358: Misfire during start cylinder 9." This will form a check and balance when conversations about the extent of the repair occur. A user who sees "P1358: Misfire during start cylinder 9" will instantaneously know they do not need to replace the transmission, thereby avoiding costly, as well as, unnecessary repairs.

The invention claimed is:

1. An apparatus comprising:
   at least one processor; and
   at least one computer-readable storage medium having encoded thereon executable instructions that, when executed by at least one processor, cause the at least one processor to carry out a method of operating a vehicle service system comprising at least one server to communicate with a plurality of mobile phones via a cellular telephone network, the method comprising:
      receiving, at the vehicle service system via the cellular telephone network, a plurality of messages from the plurality of mobile phones, each first mobile phone of the plurality of mobile phones being associated with a different first vehicle of a plurality of vehicles, wherein receiving the plurality of messages comprises receiving from each first mobile phone at least one first message comprising: (i) at least one first operational characteristic produced by the first vehicle associated with the first mobile phone that transmitted the at least one first message and indicative of a first condition of the first vehicle, the at least one first operational characteristic comprising a diagnostic code output by a diagnostic system of the first vehicle, (ii) a first indication of a first location of the first mobile phone that transmitted the at least one first message, and (iii) a first phone number for the first mobile phone that transmitted the at least one first message; and
      in response to receipt of each of the at least one first message of the plurality of messages,
         selecting at least one candidate repair organization as a candidate for performing a service for the first vehicle, wherein selecting the at least one candidate repair organization as a candidate comprises:
            comparing the first location of the at least one first message to service areas associated with a plurality of repair organizations, and
            selecting a repair organization, of the plurality of repair organizations, for inclusion in the at least one candidate repair organization when the first location is within the service area associated with the repair organization; and
         transmitting to each of the at least one candidate repair organization information describing the first condition of the first vehicle.

2. The apparatus of claim 1, wherein transmitting to each of the at least one candidate repair organization further comprises transmitting to each the first location of the first mobile phone.

3. The apparatus of claim 2, wherein transmitting to each of the at least one candidate repair organization further comprises transmitting to each the first phone number for the first mobile phone.

4. A system comprising the apparatus of claim 1, and further comprising:
   the plurality of mobile phones, wherein each first mobile phone of the plurality is in communication with a diagnostic port of the first vehicle with which the first mobile phone is associated;
   each the first mobile phone is configured to carry out a second method comprising:
      receiving, at the first mobile phone, the at least one first operational characteristic from the first vehicle via the diagnostic port of the first vehicle, the at least one operational characteristic having been generated by the first vehicle; and
      translating the at least one first operational characteristic indicative of the first condition of the first vehicle into human-readable text describing the first condition of the first vehicle;
   displaying the human-readable text on a display screen of the first mobile phone.

5. The system of claim 4, further comprising:
   a plurality of devices each having a wired connection to the diagnostic port to a vehicle of the plurality of vehicles and configured to wirelessly transmit operational characteristics received via the wired connection,
   wherein each first mobile phone of the plurality is configured to receive the at least one first operational characteristic via the diagnostic port by wirelessly receiving the at least one first operational characteristic wirelessly transmitted by a first device, of the plurality of devices, having the wired connection to the diagnostic port of the first vehicle with which the first mobile phone is associated.

6. The system of claim 5, further comprising:
   at least one computing device, each of the at least one computing device being associated with one or more of the candidate repair organizations, wherein each of the at least one computing device comprises:
      at least one second processor; and
      at least one second computer-readable storage medium having encoded thereon executable instructions that, when executed by at least one processor, cause the at least one processor to carry out a second method of addressing requests for service of vehicles, the second method comprising:
         in response to receiving from the apparatus the information describing the first condition of the first vehicle, initiating action associated with providing service to the first vehicle based on the first condition indicated by the at least one first operational characteristic.

7. The system of claim 6, wherein:
   transmitting to each of the at least one candidate repair organization further comprises transmitting to each the first phone number for the first mobile phone; and
   initiating the action associated with providing service to the first vehicle comprises transmitting to the first mobile phone an offer to perform a service to address the first condition, wherein transmitting the offer comprises transmitting an estimated cost to performing the service.

8. The system of claim 6, wherein initiating the action associated with providing service to the first vehicle comprises:
   identifying based on the at least one first operational characteristic one or more parts that may be used in remedying the first condition of the first vehicle; and
   placing an order for the one or more parts.

9. The system of claim 6, wherein initiating the action associated with providing service to the first vehicle comprises:
based on the at least one first operational characteristic that is indicative of the first condition, scheduling performance of the service to remedy the first condition at the candidate repair organization that is associated with the at least one computing device that is performing the scheduling.

10. A system comprising the apparatus of claim 1, and further comprising:
at least one computing device, each of the at least one computing device being associated with one or more of the candidate repair organizations, wherein each of the at least one computing device comprises:
at least one second processor; and
at least one second computer-readable storage medium having encoded thereon executable instructions that, when executed by at least one processor, cause the at least one processor to carry out a second method of addressing requests for service of vehicles, the second method comprising:
in response to receiving from the apparatus the information describing the first condition of the first vehicle, initiating action associated with providing service to the first vehicle based on the first condition indicated by the at least one first operational characteristic.

11. The system of claim 10, wherein:
transmitting to each of the at least one candidate repair organization further comprises transmitting to each the first phone number for the first mobile phone; and
initiating the action associated with providing service to the first vehicle comprises transmitting to the first mobile phone an offer to perform a service to address the first condition, wherein transmitting the offer comprises transmitting an estimated cost to performing the service.

12. The system of claim 10, wherein initiating the action associated with providing service to the first vehicle comprises:
identifying based on the at least one first operational characteristic one or more parts that may be used in remedying the first condition of the first vehicle; and
placing an order for the one or more parts.

13. The system of claim 10, wherein initiating the action associated with providing service to the first vehicle comprises:
based on the at least one first operational characteristic that is indicative of the first condition, scheduling performance of the service to remedy the first condition at the candidate repair organization that is associated with the at least one computing device that is performing the scheduling.

14. A method of operating a vehicle service system comprising at least one server to communicate with a plurality of cellular communication devices via a cellular telephone network, the method comprising:
receiving at least one message, at the at least one server and via the cellular telephone network, from a first cellular communication device of the plurality of cellular communication devices, the at least one message comprising at least one operational characteristic of a vehicle that is indicative of a condition of the vehicle, an indication of a location of the first cellular communication device, and an identifier for the first cellular communication device, and
based at least in part on the at least one operational characteristic, initiating action associated with providing service to the vehicle based on the condition indicated by the at least one operational characteristic.

15. The method of claim 14, wherein:
the first cellular communication device is in communication with a diagnostic port of a vehicle;
the method comprises, with the first cellular communication device:
receiving, at the first cellular communication device, the at least one operational characteristic from the vehicle via the diagnostic port, the at least one operational characteristic having been generated by the vehicle;
translating the at least one operational characteristic indicative of the condition of the vehicle into human-readable text describing the condition of the vehicle; and
displaying the human-readable text on a display screen.

16. The method of claim 15, wherein:
the first cellular communication device is in communication with the diagnostic port via a second device that has a wired connection to the diagnostic port and is configured to wirelessly transmit operational characteristics received via the wired connection to the diagnostic port; and
receiving the at least one operational characteristic at the first cellular communication device via the diagnostic port comprises receiving the at least one operational characteristic wirelessly from the second device that has the wired connection to the diagnostic port.

17. The method of claim 16, wherein the display screen is a display screen of the first cellular communication device.

18. The method of claim 17, wherein the first cellular communication device is a mobile phone.

19. The method of claim 15, wherein translating the at least one operational characteristic into the human-readable text comprises:
querying an information source based on the at least one operational characteristic; and
receiving, in response to the querying, the human-readable text.

20. The method of claim 14, wherein initiating the action associated with providing the service comprises selecting at least one entity as a candidate for performing the service based on the location of the first cellular communication device.

21. The method of claim 20, wherein selecting at least one entity as a candidate based on the location comprises:
comparing the location to service areas associated with a plurality of repair organizations; and
selecting a repair organization, of the plurality of repair organizations, for inclusion in the at least one entity when the location is within the service area associated with the repair organization.

22. The method of claim 20, wherein initiating the action associated with providing the service comprises transmitting to each of the at least one entity information describing the condition of the vehicle and the location of the first cellular communication device.

23. The method of claim 22, wherein transmitting to each of the at least one entity comprises further transmitting contact information for an operator of the vehicle.

24. The method of claim 23, wherein:
the first cellular communication device is a mobile phone; and transmitting contact information for an operator of the vehicle comprises transmitting a phone number for the mobile phone.

25. The method of claim 22, wherein transmitting to each of the at least one entity information describing the condition of the vehicle comprises transmitting the at least one operational characteristic.

26. The method of claim 25, wherein transmitting the at least one operational characteristic comprises transmitting a diagnostic code produced by a diagnostic system of the vehicle.

27. The method of claim 20, further comprising:
receiving, at a device of the operator of the vehicle, an offer to perform the service from each of one or more of the at least one entity.

28. The method of claim 27, wherein receiving, from each of one or more of the at least one entity, the offer at the device of the operator of the vehicle comprises receiving a bid to perform the service from each of the one or more of the at least one entity, the bid comprising an estimated cost to performing the service.

29. The method of claim 27, wherein:
the first cellular communication device is a mobile phone of the operator;
the device of the operator is the mobile phone of the operator; and
receiving the offer at the device of the operator comprises receiving the offer at the mobile phone of the operator.

30. The method of claim 14, wherein initiating the action associated with providing the service comprises initiating the service to be performed at the location of the first cellular communication device.

31. The method of claim 30, wherein initiating the service comprises dispatching a repair organization to perform the service to the vehicle at the location, wherein the service comprises remedying the condition, and wherein dispatching the repair organization comprises describing the condition to the repair organization.

32. The method of claim 31, wherein describing the condition to the repair organization comprises providing the at least one operational characteristic to the repair organization.

33. The method of claim 14, wherein:
receiving the at least one message comprising the indication of the first cellular communication device comprises receiving location information indicating a geographic location of the first cellular communication device.

34. The method of claim 14, wherein receiving the at least one message comprising the at least one operational characteristic comprises receiving a diagnostic code output by a diagnostic system of the vehicle.

35. The method of claim 34, wherein receiving the diagnostic code output by the diagnostic system of the vehicle comprises receiving a Diagnostic Trouble Code (DTC) output by the diagnostic system.

36. The method of claim 14, wherein receiving the at least one message via the cellular telephone network comprises receiving the at least one message via the cellular telephone network and via the Internet.

37. The method of claim 14, wherein initiating the action associated with providing the service comprises:
in response to receiving, in the at least one message, the at least one operational characteristic that is indicative of the condition,
identifying based on the at least one operational characteristic one or more parts that may be used in remedying the condition of the vehicle; and
with the vehicle service system, placing an order for the one or more parts.

38. The method of claim 14, wherein initiating the action associated with providing the service comprises:
with the vehicle service system and based on the at least one operational characteristic that is indicative of the condition, scheduling performance of the service to remedy the condition at a repair organization.

39. The method of claim 14, further comprising:
receiving, at the vehicle service system, a plurality of second messages from the plurality of cellular communication devices, each second cellular communication device of the plurality of cellular communication devices being associated with a different second vehicle of a plurality of vehicles, wherein receiving the plurality of second messages comprises receiving from each second cellular communication device at least one second message comprising at least one second operational characteristic produced by the second vehicle associated with the second cellular communication device that transmitted the at least one second message and indicative of a second condition of the second vehicle, a second indication of a second location of the second cellular communication device that transmitted the at least one second message, and contact information for the second cellular communication device that transmitted the at least one second message; and
in response to receipt of each of the at least one second message of the plurality of second messages, repeating the initiating the action associated with providing service to the second vehicle associated with the second cellular communication device that transmitted the at least one second message based on the second condition indicated by the at least one second operational characteristic.

40. The method of claim 39, further comprising:
analyzing the plurality of second messages to determine at least one trend in conditions indicated by operational characteristics.

41. The method of claim 40, wherein analyzing to determine the at least one trend comprises analyzing the plurality of second messages to determine at least one trend in component failures of the plurality of vehicles.

42. The method of claim 40, wherein analyzing the plurality of second messages comprises determining the at least one trend relative to locations, indicated by the plurality of second messages, at which vehicles experienced conditions.

43. The method of claim 39, wherein:
the plurality of cellular communication devices is a plurality of mobile phones and each cellular communication device of the plurality of cellular communication devices is a mobile phone;
each second mobile phone is in wireless communication with a diagnostic port of the second vehicle associated with the second mobile phone via a device, of a plurality of devices, that has a wired connection to the diagnostic port of the second vehicle and wirelessly transmits operational characteristics received via the wired connection to the diagnostic port of the second vehicle; and
the method further comprises, with each second mobile phone of the plurality of mobile phones:

receiving, at the second mobile phone, the at least one second operational characteristic from the second vehicle via the diagnostic port, the at least one second operational characteristic having been generated by the second vehicle;

translating the at least one second operational characteristic indicative of the second condition of the second vehicle into human-readable text describing the second condition of the second vehicle; and displaying the human-readable text on a display screen of the second mobile phone.

44. The method of claim 43, wherein:

for at least one second message received from a second mobile phone, initiating the action associated with providing the service comprises selecting at least one candidate repair organization as a candidate for performing the service based on the second location of the second mobile phone, wherein selecting at least one candidate repair organization as a candidate based on the second location comprises:

comparing the second location to service areas associated with a plurality of repair organizations, and selecting a repair organization, of the plurality of repair organizations, for inclusion in the at least one candidate repair organization when the second location is within the service area associated with the repair organization; and initiating the action associated with providing the service comprises transmitting to each of the at least one candidate repair organization information describing the second condition of the second vehicle, the second location of the second mobile phone, and the second contact information for the second mobile phone, wherein the second contact information for the second mobile phone comprises a phone number for the second mobile phone.

45. The method of claim 44, wherein transmitting to each of the at least one candidate repair organization information describing the second condition of the second vehicle comprises transmitting the at least one second operational characteristic.

46. The method of claim 44, wherein initiating the service comprises dispatching a repair organization, of the at least one candidate repair organization, to perform the service to the vehicle at the location, wherein the service comprises remedying the condition, and wherein dispatching the repair organization comprises describing the second condition to the repair organization.

47. The method of claim 46, wherein describing the second condition to the repair organization comprises providing the at least one second operational characteristic to the repair organization.

48. The method of claim 47, wherein the at least one second operational characteristic is a Diagnostic Trouble Code (DTC) generated by a diagnostic system of the second vehicle.

49. At least one computer-readable storage medium having encoded thereon executable instructions that, when executed by at least one processor, cause the at least one processor to carry out a method of operating a vehicle service system comprising at least one server to communicate with a plurality of cellular communication devices via a cellular telephone network, the method comprising:

receiving, at the vehicle service system and via the cellular telephone network, a plurality of messages from the plurality of cellular communication devices, each first cellular communication device of the plurality of cellular communication devices being associated with a different first vehicle of a plurality of vehicles, wherein receiving the plurality of messages comprises receiving from each first cellular communication device at least one first message comprising at least one first operational characteristic produced by the first vehicle associated with the first cellular communication device that transmitted the at least one first message and indicative of a first condition of the first vehicle, a first indication of a first geographic location of the first cellular communication device that transmitted the at least one first message, and a first phone number for the first cellular communication device that transmitted the at least one first message; and in response to receipt of each of the at least one first message of the plurality of messages, selecting at least one candidate repair organization as a candidate for performing a service for the first vehicle, wherein selecting the at least one candidate repair organization as a candidate comprises:

comparing the first geographic location of the at least one first message to service areas associated with a plurality of repair organizations, and selecting a repair organization, of the plurality of repair organizations, for inclusion in the at least one candidate repair organization when the first geographic location is within the service area associated with the repair organization; and transmitting to each of the at least one candidate repair organization information describing the first condition of the first vehicle, the first geographic location of the first cellular communication device, and contact information for an operator of the vehicle.

50. The at least one computer-readable storage medium of claim 49, wherein the at least one first operational characteristic is a diagnostic code produced by a diagnostic system of the first vehicle.

51. The at least one computer-readable storage medium of claim 49, wherein transmitting the information describing the first condition of the first vehicle to each of the at least one candidate repair organization information comprises transmitting the at least one first operational characteristic of the at least one first message.

52. The at least one computer-readable storage medium of claim 49, wherein the method comprises dispatching one of the at least one candidate repair organizations to provide the service for the first vehicle at the first geographic location of the first cellular communication device.

53. The at least one computer-readable storage medium of claim 52, wherein dispatching one of the at least one candidate repair organizations to provide the service comprises dispatching one of the at least one candidate repair organizations to remedy the condition at the first geographic location of the first cellular communication device.

54. The at least one computer-readable storage medium of claim 49, wherein receiving the plurality of messages via the cellular telephone network comprises receiving the plurality of messages via the cellular telephone network and via the Internet.

* * * * *